United States Patent [19]

Okuyama et al.

[11] Patent Number: 5,744,891
[45] Date of Patent: Apr. 28, 1998

[54] DC MOTOR BRUSH ASSEMBLY, METHOD OF PRODUCING THE SAME AND BRUSH MATERIAL SHEET USED THEREIN

[75] Inventors: Toshihide Okuyama; Kenji Tabata; Masahiro Kaneko; Morimasa Tsuzuki, all of Sayama, Japan

[73] Assignee: Sayama Precision Industries, Co., Ltd., Sayama, Japan

[21] Appl. No.: 863,633

[22] Filed: May 27, 1997

Related U.S. Application Data

[63] Continuation of Ser. No. 395,302, Feb. 28, 1995, abandoned.

[30] Foreign Application Priority Data

Feb. 28, 1994 [JP] Japan .................. 6-030600

[51] Int. Cl.⁶ .................................................. H02K 13/00
[52] U.S. Cl. .......................... 310/248; 310/239; 29/826
[58] Field of Search .................................. 310/248, 249, 310/239, 245, 246, 242, 244; 29/596, 597, 826

[56] References Cited

U.S. PATENT DOCUMENTS

| | | | |
|---|---|---|---|
| 3,194,931 | 7/1965 | Plasko et al. | 29/826 |
| 4,574,215 | 3/1986 | Mabuchi | 310/239 |
| 4,746,829 | 5/1988 | Strobl | 310/329 |
| 5,013,952 | 5/1991 | Sekine et al. | 310/239 |
| 5,363,005 | 11/1994 | Shibata et al. | 310/244 |

*Primary Examiner*—Thomas M. Dougherty
*Attorney, Agent, or Firm*—Oblon, Spivak, McClelland, Maier & Neustadt, P.C.

[57] ABSTRACT

A DC motor brush assembly includes a brush brought into contact with a commutator piece which is connected to the coil of a DC motor, and a brush holder of plastic material for holding the brush against the motor housing. The brush is formed by bending from a bottom shield sheet. The bottom shield sheet is brought into intimate contact with a mold to form a non-molding chamber containing the brush when the brush holder is to be insert-molded. The brush holder is molded integrally over the bottom shield sheet.

9 Claims, 9 Drawing Sheets

DC MOTOR BRUSH ASSEMBLY, METHOD OF PRODUCING THE SAME AND BRUSH MATERIAL SHEET USED THEREIN

This application is a Continuation of application Ser. No. 08/395,302, filed on Feb. 28, 1995, now abandoned.

BACKGROUND OF THE INVENTION

1. Field of the Invention

The present invention relates to a DC motor brush assembly comprising brushes adapted to contact a commutator piece which is connected to the coil of a DC motor and plastic brush holders for holding the brushes relative to the motor housing, and also to a method of producing the same. The present invention also relates to a brush material sheet used to make the brush.

2. Description of the Prior Art

In basic DC motors, an electric current is supplied to the coil through brushes in contact with the commutator piece on the rotor shaft while switching the polarities of the electric current, the rotation of the rotor shaft being thus continued. Such DC motors are now in wide use since they can be produced inexpensively and easily. However, such DC motors have continuously been improved to increase the efficiency and to decrease the size. Particularly, recent studies of permanent magnet materials have greatly contributed to reduction of motor size and increased output power.

Size-reduced motors are widely used in all industrial applications and at present, particularly in portable instruments. For example, in portable instruments such as pagers and other portable time pieces, such motors are utilized as a vibrating motor for indicating the reception of a calling signal or as a source of alarm vibration. Such portable instruments are usually required to be reduced in thickness as much as possible. Because pagers and other alarm vibration sources are to be located in intimate contact with the body of a user to provide a certain alarm, they must have sufficient thinness to be received in a pocket of the user's clothing.

The improvements of such small-sized brush motors in the prior art are mainly directed to reducing the thickness of the rotor and/or stator. Improved motors have been proposed in Japanese Patent Application Nos. Hei 5-42322 and 5-135745.

As the thickness of the motors approaches the limit, which is several millimeters in recent years, it is also required to reduce the brush assemblies in size, in addition to the rotors and stators.

In the prior art, a pair of brushes are fixedly held in the motor housing through brush holder, thereby achieving reliable contact of the brushes with a commutator. To reduce the size of such a brush assembly comprising the brushes and brush holder, each of the brushes is integrally insert-molded into the brush holder made of plastic.

When the molded plastic adheres to the brushes themselves, the conductivity between the brushes and the commutator may be degraded. To overcome such a problem, the prior art proposed a non-molding chamber free of plastic material. The tip of the brush is received within the non-molding chamber while only the root thereof is insert-molded into the brush holder.

However, this requires a mold structure which can hold the root of the brush, resulting in a very complicated mold structure. More particularly, such a mold structure capable of holding the brush and receiving the brush in the non-molding chamber cannot usually be provided by only upper and lower mold halves. An additional slide mold section is also required. In such a complicated mold structure, there is a limit to the extent to which the size of the mold can be reduced. It is impossible to provide a brush assembly reduced in size or thickness. As a result, a small-sized portable DC motor having various features that are required by vibrating motors used for pagers and the like could not be provided in the prior art.

Particularly, the prior art requires a more complicated mold structure since the paired brushes are separately held by the respective molds when they are to be molded into the brush holder. This makes it difficult to produce brush assemblies inexpensively and efficiently.

SUMMARY OF THE INVENTION

In view of the problems in the prior art, it is an object of the present invention to provide a DC motor brush microassembly which can be easily produced by the use of a simple mold structure. Another object is to provide a method of producing such a brush microassembly. Still another object is to provide a brush material sheet used to produce such a brush microassembly.

In the first aspect of the present invention, there is provided a DC motor brush assembly comprising a brush contacting a commutator piece connected to the coil of a DC motor and a plastic brush holder for holding the brush relative to the motor housing, wherein the brush is formed by bending from a bottom shield sheet, the bottom shield sheet being brought into intimate contact with a mold to form a non-molding chamber for receiving the brush during a molding process, and the brush holder being molded integrally with the bottom shield sheet.

With such an arrangement, during the molding process, the non-molding chamber is formed by the mold and the bottom shield sheet in contact with the mold, for containing the brush so as to prevent the molten plastic material from adhering to the brush. When such a bottom shield sheet integral with the brush is utilized as a shield for preventing the molten plastic material from adhering to the brush, the non-molding chamber is formed in part by the mold and in part by the bottom shield sheet. Thus, the structure of the mold can greatly be simplified while accomplishing a reduction in the mold size.

In the second aspect of the present invention, there is provided a brush material sheet molded into a plastic brush holder to be fixed on the housing of a DC motor and used to form a pair of brushes contacting a commutator piece connected to the coil of the motor, the brush material sheet comprising a bottom shield sheet intimately contacting a mold during the molding process to form a non-molding chamber containing the brushes, the brushes being formed by bending from the bottom shield sheet, an outer peripheral connection portion connected to the bottom shield sheet for holding the bottom shield sheet relative to the mold during the molding process, and a separation slit formed in the bottom shield sheet for splitting the bottom shield sheet into corresponding parts to the brushes when the outer peripheral connection portion is cut away from the bottom shield sheet.

With such an arrangement, the brush material sheet can hold, in a single sheet, the brushes of both polarities connected by the outer peripheral connection portion until the insert-molding step is completed. Therefore, the handling and assembling thereof are extremely easy. As a result, the structure of the mold can be greatly simplified while accomplishing reduction of the mold size, eliminating the need for any slide mold, unlike the prior art in which the brushes of both polarities are separately dealt with.

In the third aspect of the present invention, there is provided a method of producing a DC motor brush assembly, comprising the steps of holding a brush material sheet, including a bottom shield sheet, between upper and lower mold halves to form a non-molding chamber between one of the mold halves and the bottom shield sheet, the non-molding chamber containing a brush formed by bending from the bottom shield sheet, and pouring a molten plastic material into a mold cavity formed by the upper and lower mold halves to form a brush holder into which the brush is molded.

With such an arrangement, the non-molding chamber for containing the brush can be formed during molding between the mold half and the bottom shield sheet by simply holding the brush material sheet between the upper and lower mold halves. Therefore, a small-sized brush assembly can be very simply and easily obtained by the use of a simplified mold structure.

BRIEF DESCRIPTION OF THE DRAWINGS

The above and other objects, features and advantages of the present invention will be apparent from reading the following description of preferred embodiments with reference to the accompanying drawings in which.

DETAILED DESCRIPTION OF PREFERRED EMBODIMENTS

Some preferred embodiments of the present invention will now be described with reference to the accompanying drawings.

Figure 1:
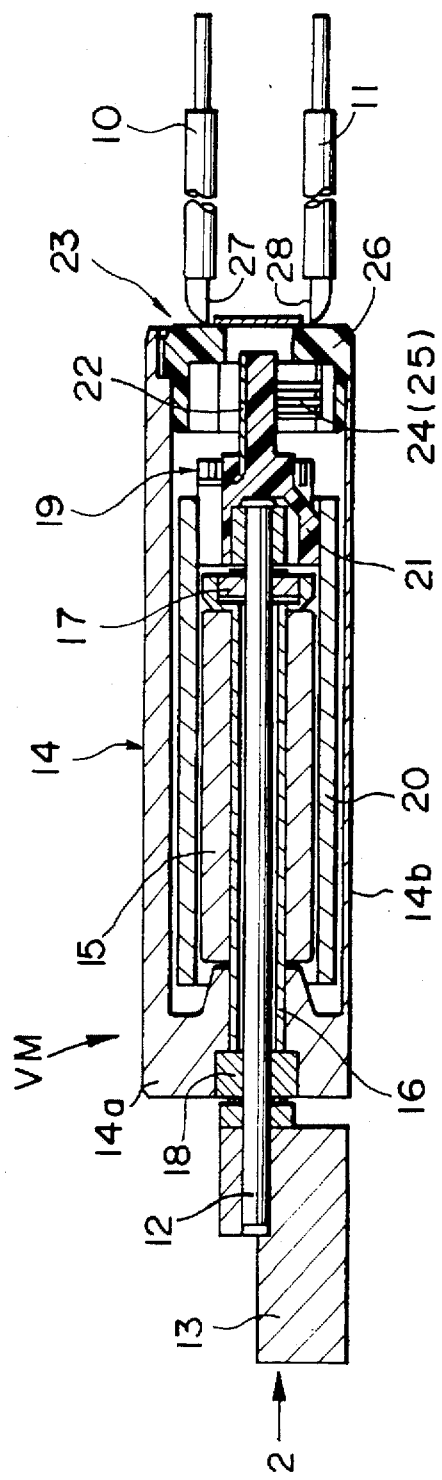
FIG. 1 is a cross-sectional view of the primary parts of a pager DC motor into which a brush assembly of the present invention is incorporated.
Figure 2:
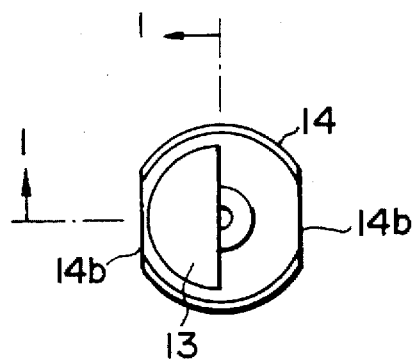
FIG. 2 is a side view of the pager DC motor as viewed in a direction of arrow 2 in FIG. 1.

Referring first to FIGS. 1 and 2, there is shown a pager vibration motor into which a brush assembly of the present invention is incorporated. The pager vibration motor VM is incorporated into a pager (not shown) and adapted to vibrate the entire pager to indicate the reception of a calling signal to a user. The pager vibration motor VM receives an electric current from an external battery or the like (not shown) through leads 10 and 11. When a rotor shaft 12 is energized and rotated by the supplied current, an eccentric weight 13 of semi-circular cross-section (see FIG. 2) fixedly mounted on the rotor shaft 12 at its protruding end is rotated at a position offset from the axis of the rotor shaft 12. This generates a vibration.

The vibration motor VM comprises a cylindrical motor housing 14 having one closed end 14a. The outer periphery of the motor housing 14 includes sliced faces 14b, 14b formed therein to reduce the thickness of the pager, as shown more clearly in FIG. 2.

In the motor housing 14, a magnet holder 16 is disposed for supporting a permanent magnet 15. The magnet holder 16 is press fitted, at one end, into the closed end 14a of the motor housing 14 and extends in the axial direction. The permanent magnet 15 is formed into a tubular configuration and fixedly mounted on the outer periphery of the magnet holder 16. The motor housing 14 and magnet holder 16 are made of a magnetic material. A DC brush motor stator is constituted by the motor housing 14, magnet holder 16 and permanent magnet 15.

The rotor shaft 12 extends through the magnet holder 16. The end of the rotor shaft 12 positioned inside the motor housing is rotatably supported by the tip end of the magnet holder 16 through a bearing 17 while the opposite or protruding end of the rotor shaft 12 is rotatably supported by the closed end 14a of the motor housing 14 through a bearing 18.

The inner portion end of the rotor shaft 12 includes a cylinder-like coil 20 integrally connected thereto through a commutator assembly 19. The coil 20 is rotatable in a cylinderical space defined between the inner wall of the motor housing 14 and the permanent magnet 15. The commutator assembly 19 comprises a commutator holder 21 of insulation plastic material and commutator pieces 22 insert-molded into the commutator holder 21. In this embodiment, three commutator pieces 22 insulated from one another are electrically connected to three rotor coils in sequence. Thus, a rotor is constituted by the rotor shaft 12, commutator assembly 19 and coil 20.

The other or open end of the motor housing 14 fixedly supports a brush assembly 23. The brush assembly 23 comprises a pair of brushes 24 and 25 sequentially brought into contact with the commutator pieces 22 and a brush holder 26 for supporting the brushes 24 and 25. The brush holder 26 is made of an insulating plastic material. The two brushes 24 and 25 are insert-molded into the brush holder 26, as will be described later. When the rotor is rotated, the brushes 24 and 25 can sequentially supply the DC power to the respective rotor coils while switching the polarities thereof. The brushes 24 and 25 receive the electric current from leads 10 and 11 through lead terminals 27 and 28.

As described above, the vibration motor to which this embodiment is applied is of a thin structure, as if the motor itself is extended in the longitudinal direction, the external diameter thereof being reduced, for example, to about 4 mm or less between the sliced faces 14b, 14b. It is therefore required to produce a brush assembly applicable to such a thin motor in a simple manner.

The brush assembly 23 and a method of producing it according to the present invention will now be described in detail.

Figure 3:
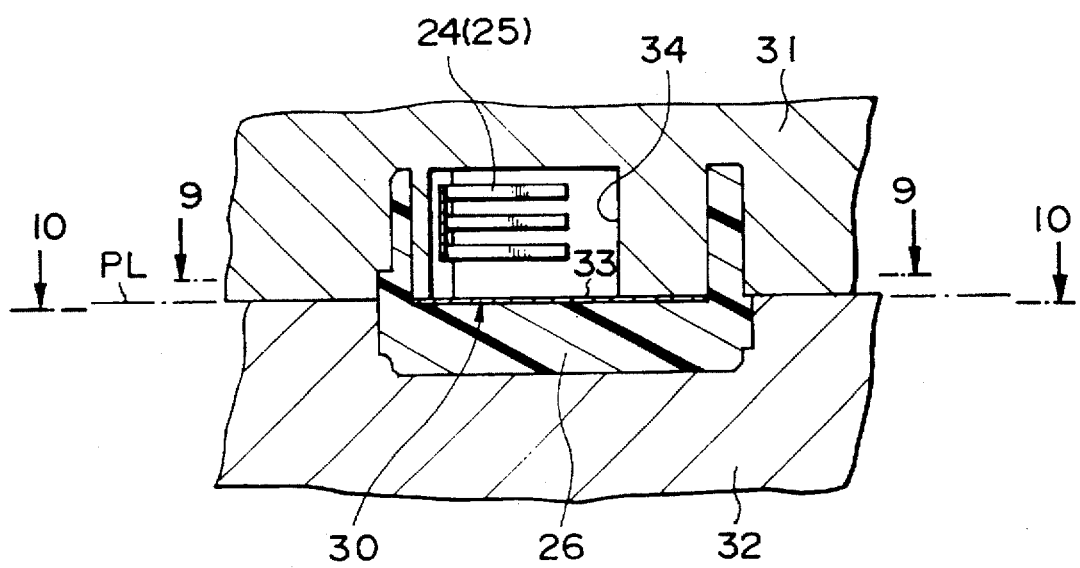
FIG. 3 is a schematic cross-section of upper and lower mold halves associated with each other when the insert-molding step is to be carried out according to the present invention.

According to the present invention as briefly shown in FIG. 3, a brush material sheet 30 including a bottom shield sheet 33 is held between upper and lower mold halves 31, 32 to form a non-molding chamber 34 between the upper mold half 31 and the bottom shield sheet 33, the non-molding chamber 34 being adapted to contain the brushes 24 and 25 which are formed by bending from the bottom shield sheet 33. A molten plastic material is then poured into a mold cavity formed by the upper and lower mold halves 31, 32 to form a brush holder 26 into which the bottom shield sheet 33 is molded.

Referring to FIG. 3, the upper and lower mold halves 31, 32 are closed at a parting line PL to mold the brush holder 26. During the molding process, the brushes 24 and 25 are contained within the non-molding chamber 34. The molten plastic material will not flow into the non-molding chamber 34. Therefore, the surfaces of the brushes 24 and 25 will be exposed so as to maintain the electrical contact with the commutator pieces.

Figure 4:
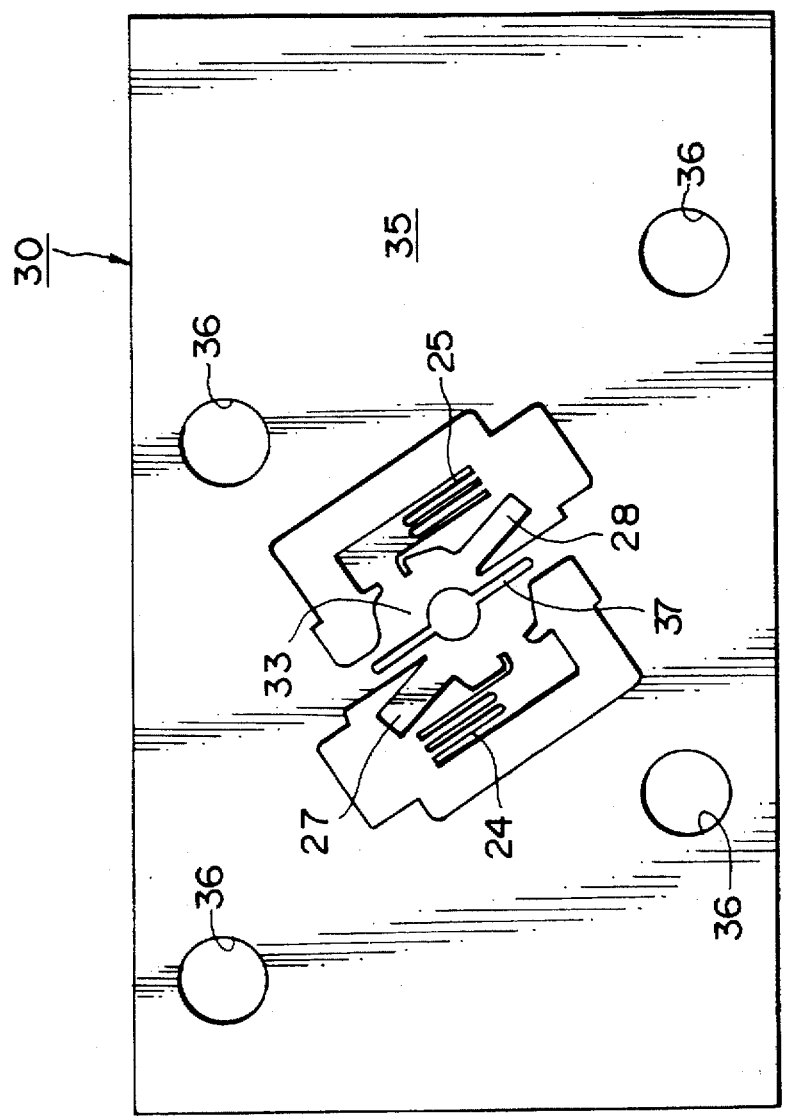
FIG. 4 is a plan view of one embodiment of a brush material sheet in accordance with the present invention.

FIG. 4 shows a brush material sheet 30 for providing the brushes 24 and 25. This brush material sheet 30 comprises a phosphor bronze base having a thickness equal to about 50 microns and brush contact portions integrally formed of a coating or cladding material of gold or silver alloy on the base. The brush material sheet 30 has a bottom shield sheet 33, a pair of brushes 24 and 25 connected to the bottom shield sheet 33 and a pair of lead terminals 27 and 28 similarly connected to the bottom shield sheet 33, all of which are formed by punching the brush material sheet 30. The outer peripheral connection portion 35 connected to the bottom shield sheet 33 is adapted to hold the bottom shield sheet 33 with respect to the mold halves 31 and 32 when the brush holder is being molded. For such a purpose, the outer peripheral connection portion 35 is formed to have sufficient dimensions to enable it to be held between the mold halves 31 and 32 and includes four positioning holes 36 into which the mold halves 31 and 32 fit when they are closed. Thus, the brushes 24 and 25 can be held within the brush material sheet 30 by the outer peripheral connection portion 35 until the brush holder has been insert-molded.

The bottom shield sheet 33 includes a separation slit 37 for splitting the bottom shield sheet 33 into corresponding parts for the brushes 24 and 25 when the outer peripheral connection portion 35 is cut away from the bottom shield sheet 33. When the molding of the brush holder 26 is completed, the bottom shield sheet 33 is cut across the separation slit 37, so that a pair of brush poles will be formed which are electrically separated from each other through the separation slit 37.

Figure 5:
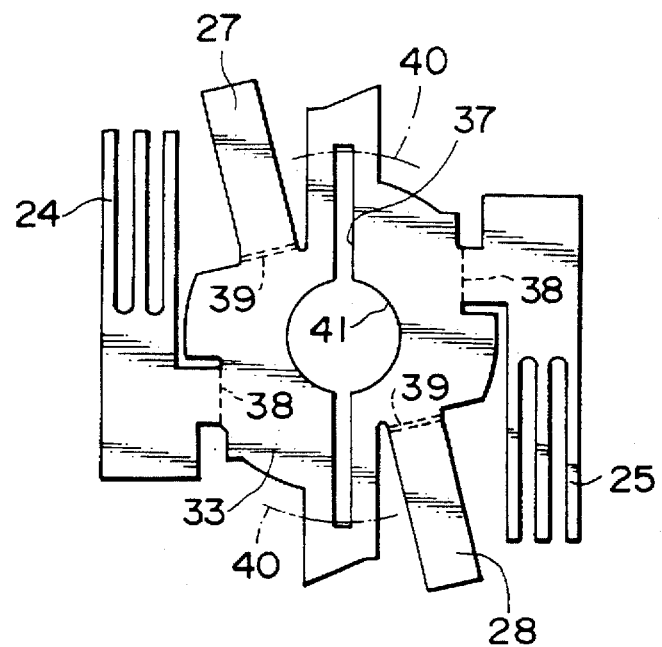
FIG. 5 is an enlarged plan view of the brushes in the brush material sheet shown in FIG. 4.

When the insert-molding step is to be carried out, the brushes 24 and 25 are bent along broken lines 38 and the lead terminals 27 and 28 are bent along double broken lines 39, as shown in FIG. 5. When the outer peripheral connection portion 35 of the brush material sheet 30 outwardly extending from the molded brush holder 26 is cut away along dashed lines 40, the brushes 24 and 25 are electrically separated from each other. At the central portion of the bottom shield sheet 33, a mold receiving opening 41 is provided to be brought into intimate contact with the upper and lower mold halves 31, 32 to hold the bottom shield sheet 33 when the insert-molding step is being performed.

Figure 6:
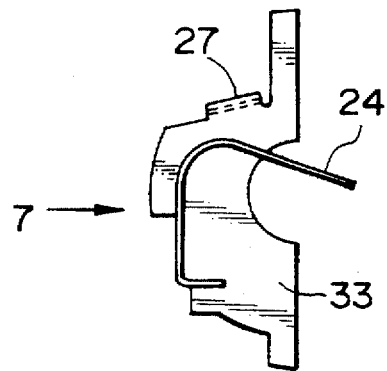
FIG. 6 is a plan view of one of the brushes when the outer peripheral connection portion is cut away from the brush material sheet.
Figure 7:
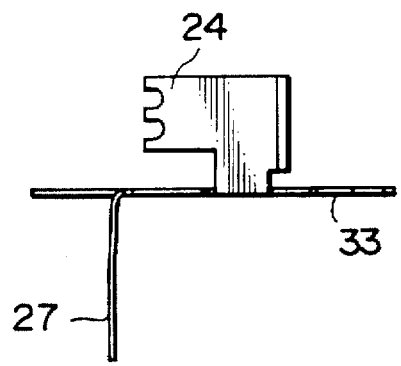
FIG. 7 is a side view as viewed in a direction of arrow 7 in FIG. 6.
Figure 8:
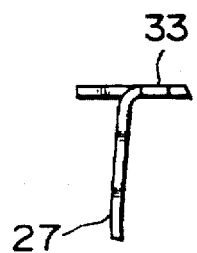
FIG. 8 is an enlarged view of the lead root portion shown in FIG. 7.

When the outer peripheral connection portion 35 is cut, such brush pieces as shown in FIGS. 6 and 7 are obtained. Each of these brush pieces includes the brush 24 and lead terminal 27 which are bent from the bottom shield sheet 33 in the opposite directions. As shown more clearly in FIG. 8, the lead terminal 27 is bent at its root portion relative to the bottom shield sheet 33 at an angle slightly larger than a right angle. Through such a two-angle bending, the tip end of the lead terminal 27 can be bent more precisely. This enables the tip end of the lead terminal 27 to be easily held by the lower mold half 32, as will be described later. The inclination at the root portion of the lead terminal 27 can reliably prevent the brush 24 from falling off the molded brush holder 26.

Figure 9:
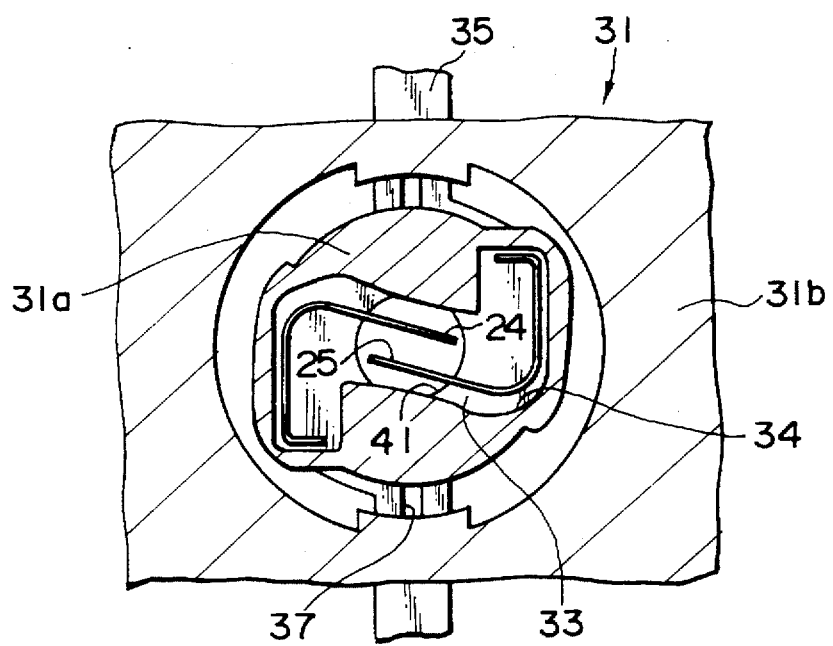
FIG. 9 is a cross-sectional view taken along a line 9—9 in FIG. 3.

As shown in FIG. 9, the upper mold half 31 comprises a column-like mold part 31a for defining the internal diameter of the cylindrical brush holder 26 and another mold part 31b for defining the external diameter of the same. The column-like mold part 31a cooperates with the bottom shield sheet 33 of the brush material sheet 30 to form the non-molding chamber 34. Thus, the molten plastic material will flow into a molding chamber formed between the column-like mold part 31a and the mold part 31b while the molten plastic material will not penetrate the non-molding chamber 34.

Figure 10:
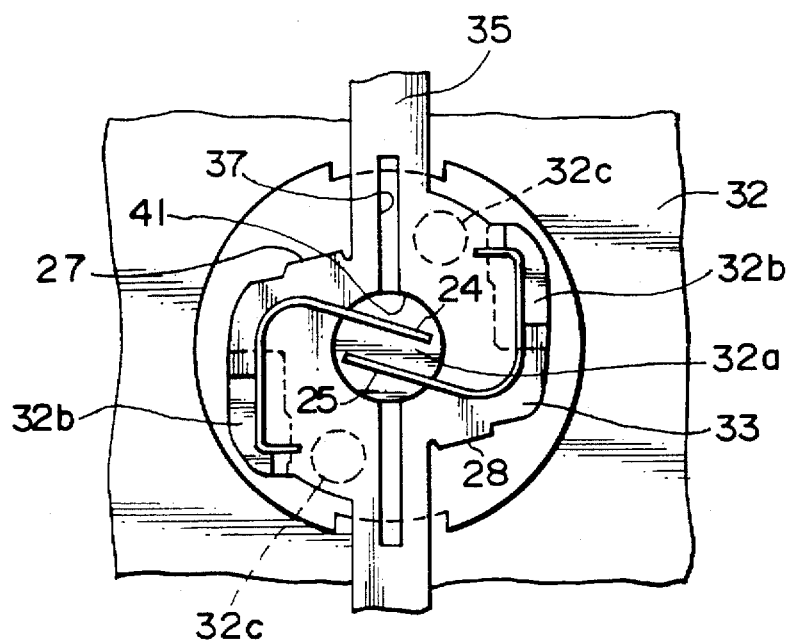
FIG. 10 is a cross-sectional view taken along a line 10—10 in FIG. 3.

Referring also to FIG. 10, the lower mold half 32 includes a first column-like mold part 32a for closing the mold receiving opening 41 of the bottom shield sheet 33 and a second column-like mold part 32b for closing gaps formed behind the bent brushes 24 and 25. The first and second column-like mold parts 32a, 32b serve to completely close the non-molding chamber 34. The mold receiving opening 41 is not only brought into intimate contact with the lower mold half 32, but also functions as a jig insertion port through which a jig is used to slightly enlarge the distance between the brushes 24 and 25 such that they will be reliably brought into contact with the commutator pieces when the brush assembly is assembled into the motor. The lower mold half 32 also includes a third column-like mold part 32c which can engage the underside of the bottom shield sheet 33 to keep it flat when the brush holder is being molded.

Figure 11:
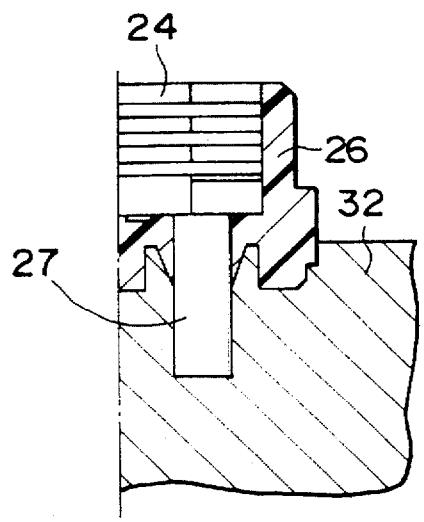
FIG. 11 is a cross-sectional view of the lead terminal held by the lower mold half.

As shown in FIG. 11, the lead terminal 27 is held by the lower mold half 32. More particularly, the tip end of the lead terminal 27 is inserted into a holding aperture formed in the lower mold half 32 so that the root portion of the lead terminal 27 will be insert-molded in the brush holder 26.

Figure 12:
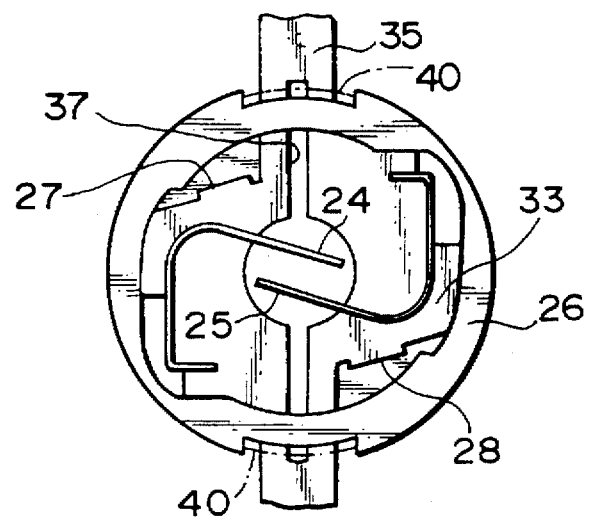
FIG. 12 is a cross-sectional view of the brush material sheet subjected to the insert-molding step.

FIG. 12 shows the brushes 24 and 25 which have been insert-molded in the brush holder 26. In such a situation, the outer peripheral connection portion 35 remains integrally connected to the bottom shield sheet 33 even when the brush holder 26 is removed away from the upper and lower mold halves 31 and 32. Subsequently, the outer peripheral connection portion 35 is cut away from the bottom shield sheet 33 along the dashed lines 40.

Although the embodiment has been described as to the brushes and lead terminals integrally formed in the bottom shield sheet of the brush material sheet, the lead terminals may be omitted with lead being soldered directly to the bottom shield sheet.

Figure 13:
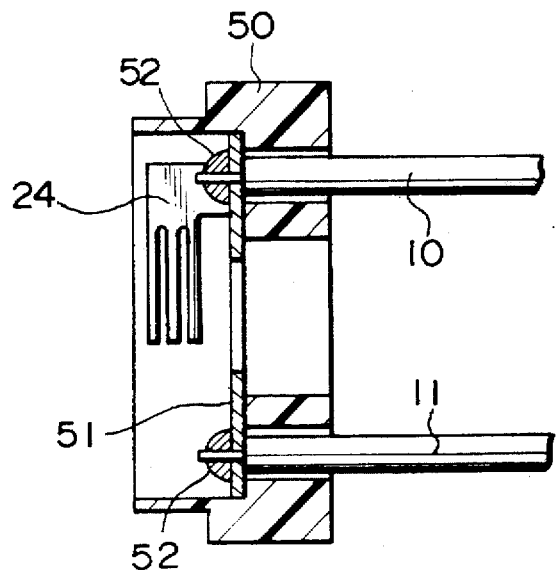
FIG. 13 is a cross-sectional view of another embodiment of a brush assembly constructed in accordance with the present invention.
Figure 14:
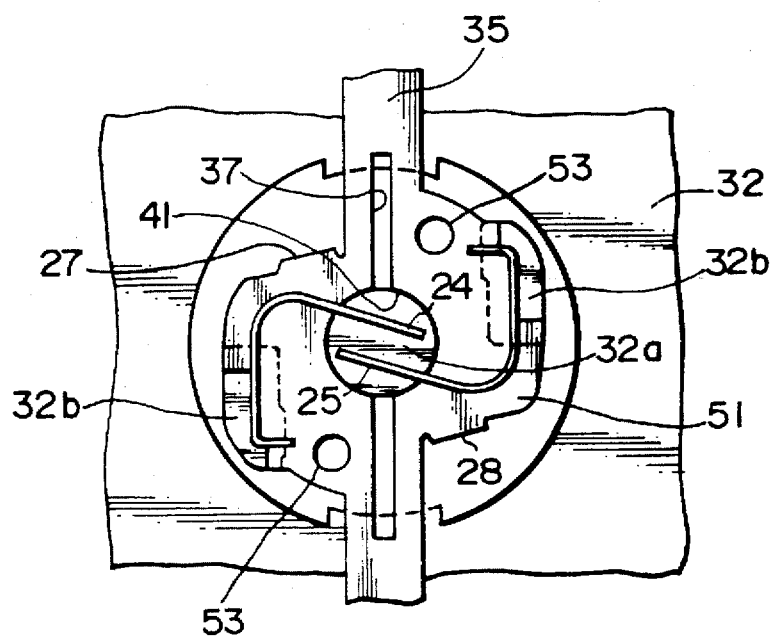
FIG. 14 is a plan view of the brush assembly in FIG. 13.

FIGS. 13 and 14 show such a brush assembly of the present invention in which the lead terminals are omitted. In FIGS. 13 and 14, a bottom shield sheet 51 integrally formed with a brush 24 is insert-molded into a brush holder 50. The brush holder 50 includes holes formed therethrough. Leads 10 and 11 extend through the holes with the tip ends thereof being soldered at 52 to the respective pole parts of the bottom shield sheet 51 which are separated by a separation slit, as shown. In such an arrangement, the structure of the brush material sheet can be simplified.

The brush material sheet 30, the brushes 24 and 25 incorporated into the brush material sheet 30 and other parts may be modified or changed to any other configurations, without being limited to the illustrated embodiments. The separation slit 37 is not limited to the linear form as shown, but may be formed into any other suitable configuration depending on the relationship between the separation slit and the lower mold half 32. Further, the mold receiving opening 41 and separation slit 37 may be provided by one opening or slit.

We claim:

1. A brush material sheet having a shield sheet portion molded into one surface of a plastic brush holder with an oppositely facing plastic surface forming one end of a housing of a DC motor, said brush material sheet further comprising:

an electrically conductive brush forming portion associated with the shield sheet portion, said electrically conductive brush forming portion used to form a pair of brushes contacting a commutator piece connected to a coil of the motor, said brushes being formed by bending said electrically conductive brush forming portion away from said brush material sheet;

an outer peripheral connection portion connected to the shield sheet portion for holding the shield sheet portion during a molding process to cover a non-molding chamber formed as a concavity in a portion of a mold, said non-molding chamber being of a size to contain said brushes formed by bending; and a separation slit formed in the brush material sheet for splitting the brush material sheet into segments corresponding to the brushes and an associated shield sheet portion when the outer peripheral connection portion is cut away from the brush material sheet.

2. The brush material sheet of claim 1, further comprising a pair of lead terminals formed by bending an electrically conductive terminal portion associated with the shield sheet portion from said brush material sheet, said lead terminals being connected to supply an electric current to the brushes.

3. The brush material sheet of claim 1, wherein said outer peripheral connection portion includes a positioning hole to align one part of the mold to another part of the mold when the mold parts are closed during molding.

4. The brush material sheet of claim 1, wherein the shield sheet portion includes holes through which leads penetrate to supply an electric current to the brushes.

5. A DC motor brush assembly comprising a pair of brushes contacting commutator pieces connected to a coil of a DC motor and a plastic brush holder for holding the brushes relative to a motor housing, wherein said brushes are formed by bending from a bottom shield sheet, said bottom shield sheet being brought into intimate contact with a mold to form a non-molding chamber for receiving said brushes during a molding process, said brush holder being molded integrally with said bottom shield sheet, said bottom shield sheet being held relative to the mold by an outer peripheral connection portion connected to the bottom shield sheet during the molding process, said bottom shield sheet being split into parts corresponding to the brushes by a separation slit formed in the bottom shield sheet when the outer peripheral connection portion is cut away from the bottom shield sheet, wherein the bottom shield sheet covers a plastic base portion surface of the plastic brush holder with the brushes bent away from the bottom shield sheet being separated from the plastic base portion of the plastic brush holder by the bottom shield sheet with the motor having a longitudinal axis lying in a plane orthogonal to the plastic base portion surface.

6. A DC motor brush assembly for supplying a DC motor driving current, comprising:

a molded resin brush holder including a holder body which forms an exterior molded resin end portion of a motor housing extending in a longitudinal direction of a motor axis, said molded resin brush holder being molded using a first die having a concave portion for forming a non-molding chamber and a second die having a shape corresponding to an outer side of the holder body forming the exterior molded resin end portion of the motor housing;

an electrically conductive sheet having a first portion comprising a shield sheet surface portion molded into said molded resin brush holder and an opposite exposed shield sheet surface portion, the opposite exposed shield sheet surface portion extending in a plane parallel to a plane including the exterior molded resin end portion of the holder body, said opposite exposed shield sheet surface portion thereby separating the exterior molded resin end portion from the interior of the motor housing, wherein said shield sheet surface portion molded into said molded resin brush holder is seized to prevent molding resin from entering the non-molding chamber during molding; and a second portion of said sheet forming a pair of brushes bent in a direction of said motor axis from said sheet first portion such that said pair of brushes are accommodated in said non-molding chamber and separated from molding resin during molding and also are accommodated in an interior space of the motor housing.

7. The DC motor brush assembly of claim 6, wherein at least one lead terminal is formed by bending a third terminal portion from said sheet, said at least one lead terminal being connected to supply an electric current to drive said DC motor.

8. The DC motor brush assembly of claim 7, wherein said brushes and said at least one lead terminal formed by bending from the sheet are bent so as to project in opposite directions.

9. The DC motor brush assembly of claim 6, wherein said first die includes a further concave portion for forming a molded resin wall for attaching the holder body to the motor housing.

* * * * *